Patented Nov. 6, 1945

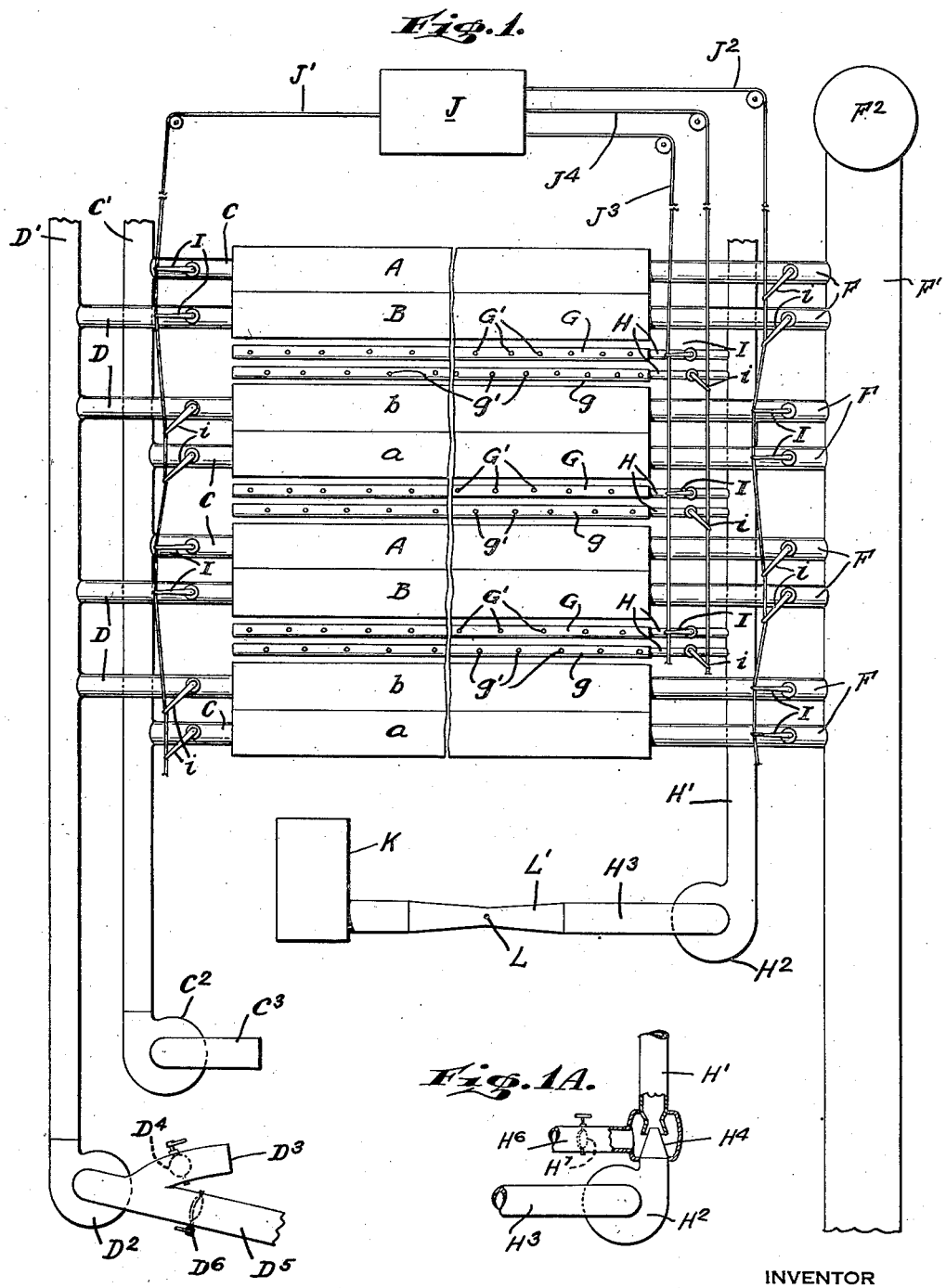

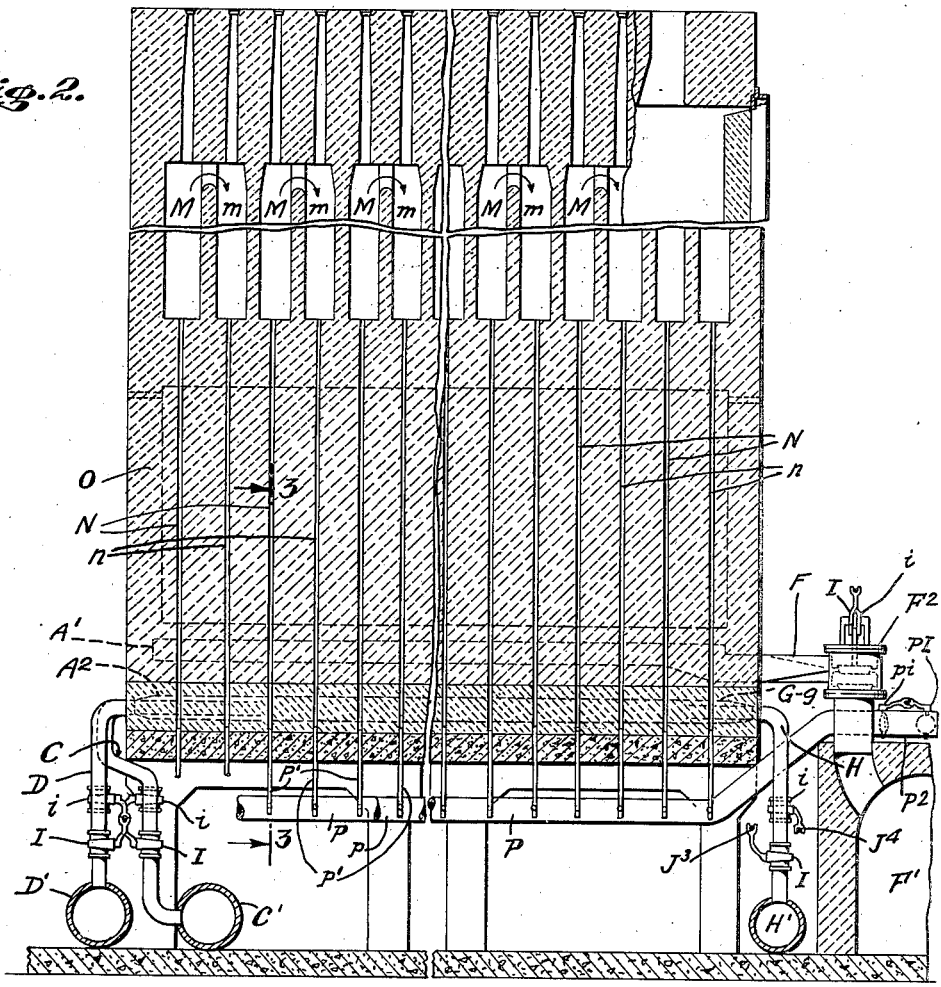
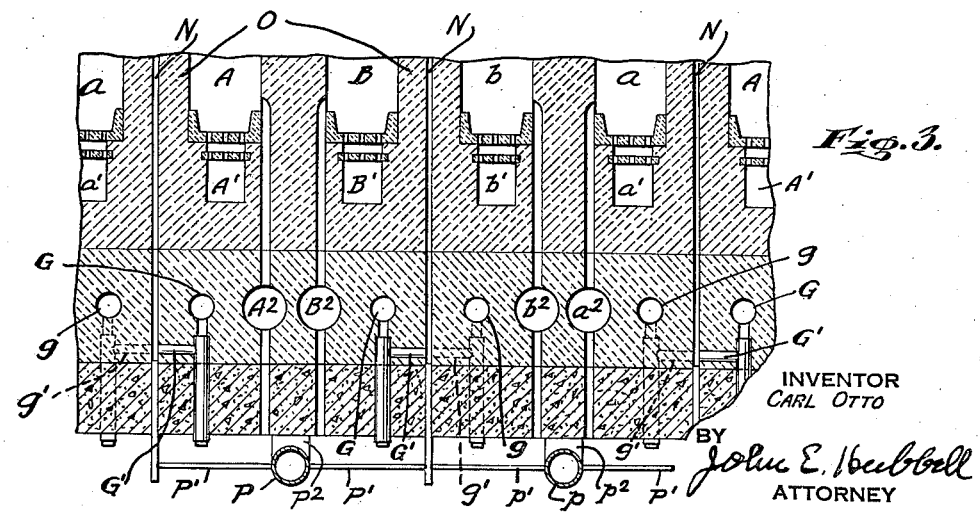

2,388,438

UNITED STATES PATENT OFFICE 2,388,438

UNDERFIRED COKE OVEN FUEL SUPPLY MEANS

Carl Otto, Manhasset, N. Y., assignor to Fuel Refining Corporation, New York, N. Y., a corporation of Delaware Application June 4, 1942, Serial No. 445,723

3 Claims. (Cl. 202—142)

The present invention relates to underfired coke ovens of the type, known as combination ovens, which comprise regenerators optionally usable for preheating combustion air only, or for preheating both combustion air and lean gas, accordingly as the ovens are heated by the combustion of coke oven gas or other rich fuel gas which does not require regenerative preheating, or is heated by the combustion of blast furnace gas or other lean gas which cannot give suitably high oven temperatures unless regeneratively preheated. In heating such underfired ovens with rich fuel gas, the latter is passed to each of the vertical heating flues through uprising gas channels which extend upward to the lower ends of the different heating flues through regenerator division walls, and have individual adjustment devices accessible for adjustment from the basement space which underlies the coke oven brick work.

The general object of the present invention is to provide improved means for mixing a small amount of air with the rich fuel gas passed into the heating flues through the rich gas supply channels in the operation of the ovens with rich fuel gas. The air thus admixed with the rich fuel gas prevents or minimizes objectionable carbon deposits in the hotter upper portions of the gas channels in the regenerator division walls and contributes to improved combustion conditions in the heating flues.

More specific objects of the present invention are to provide means for mixing air with the rich fuel gas supplied to coke ovens of the type specified, which will avoid objectionable features inherent in an arrangement heretofore proposed and characterized by the provision of a small, continuously open bleed orifice in each of the individual gas supply pipes connected to the different uprising gas channels. Under normal operating conditions a continuous air inflow through each of such bleed orifices is maintained by the suction transmitted through the heating flues and channels to said gas supply pipes. With such continuously open bleed orifices temporary increases in the rich gas pressure in the supply pipe connections can be expected to cause an outflow of gas into the battery basement from time to time. Such gas outflow creates an explosion risk, and in addition it pollutes the basement atmosphere and thereby impairs the working capacity and endangers the health of the oven attendants working in the basement space.

In accordance with the present invention, I mix atmospheric air with the rich fuel gas passing through the uprising gas channels of a coke oven battery, by providing an inlet in the form of one or more bleed ports or orifices, opening from the atmosphere external to the basement space into a portion of the supply piping system which is external to the basement space and in which a sub-atmospheric pressure is maintained by the stack suction and/or compressor action which moves the rich fuel gas through the piping system from the source of such gas to the supply channels. Furthermore, I locate the air inlet port or ports in the piping system at the inlet side of valves adapted for automatic actuation by the mechanism necessarily provided to reverse the direction of flow through the heating flues and regenerators in such manner that said valves prevent the inflowing air from entering any uprising gas channel during the period in which the flow is downward through the heating flue to which that channel is connected. In some cases, moreover, said valves will be automatically adjusted, and in other cases they may readily be adjusted at the will of the battery operator, so as to prevent inflow of air into the uprising gas channels during any stage of lean gas operation.

The general principles of the present invention are adapted for use in compound underfired coke oven batteries of various types, including, in particular, the so called "cross-over," "hairpin flue" and "four-divided regenerator" types.

In a simple embodiment of the present invention, the air inlet is formed in the piping through which rich fuel gas is drawn by a gas pump from the by-product apparatus of the coke oven plant. Such a pump may be located at the coke oven battery to serve the single purpose of supplying gas at a suitable pressure to the battery, or, if the admixture of air with the gas is not objectionable for any of the purposes for which the gas may be used, the air inlet may be formed in the supply pipe of the exhauster which draws the gas through the by-product apparatus and delivers it to the distribution piping through which it is passed to the coke ovens and to other gas using apparatus. When thus formed in the supply or inlet pipe of a gas pump or exhauster, the air inlet may open if necessary to insure the desired sub-atmospheric pressure, into the throat portion of a Venturi section included for the purpose in said inlet pipe. Alternatively, the gas may be used as the motive fluid in an injector drawing air from the atmosphere.

In another form of the invention, air is drawn into admixture with the rich fuel gas passing to the different uprising gas channels through inlet ports formed in the walls of the individual gas supply pipe connected to such channels and each of which connects the corresponding supply pipe to an air pipe which opens to the atmosphere at a point outside the basement space, and includes a valve. The latter is opened and closed by the battery reversing means to prevent the inflow of air into the uprising gas channels while the heating gas flow is down to the regenerators through the heating flues to which said channels are respectively connected.

The closure of the valves in said air pipes during alternate reversal periods, as just described, avoids an injection of air into the regenerators which is unnecessary and undesirable in all cases and which is responsible for the major portion of the thermal efficiency impairment occurring when air is continuously bled into the uprising gas channels during lean gas operation. Moreover the last mentioned valves may, and ordinarily will be connected to the portion of the reversing mechanism employed to operate the rich fuel gas admission valves, and may readily be adjusted to continuously maintain all valves associated therewith in their closed positions throughout lean gas operation periods.

Thus, in each of the above mentioned embodiments of the present invention, I make use of the mechanism necessarily employed to reverse the direction of flow through the regenerators and heating flues to prevent the flow of air into the uprising gas channels during periods in which said channels are not receiving rich fuel gas. In the first mentioned embodiment of the invention this result is obtained without requiring any increase in the number of reversing valves, and with the last mentioned embodiment of the invention the result may be obtained by the addition to the battery of but a single reversing valve for each of its heating walls.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Of the drawings:

Fig. 1 is a diagram illustrating the means employed to supply fuel gas and combustion air to and to withdraw waste gases from a coke oven battery embodying one form of the present invention;

Fig. 1A is a diagrammatic representation of a modification of the air introducing means shown in Fig. 1;

Fig. 2 is a transverse section through a coke oven battery embodying a different form of the invention; and Fig. 3 is a partial section on the line 3—3 of Fig. 2.

In Figs. 2 and 3 I have illustrated the use of one embodiment of the present invention in a coke oven battery of the hairpin flue type, and in Fig. 1, I have diagrammatically illustrated the use of another embodiment in a coke oven battery, including features of construction and arrangement common to such a hairpin flue battery as is shown in Figs. 2 and 3 and to an ordinary cross-over battery of the general character now in extensive use in this country.

In the coke oven battery partially illustrated in diagrammatic form in Fig. 1, A and $a$ represent regenerators used only in preheating combustion air, each regenerator A being an "on" or "off" regenerator when the regenerators $a$ are "off" or "on" regenerators, respectively. B and $b$ represent regenerators used in preheating lean gas in lean gas operation, the regenerators B being "on" or "off" when the regenerators $b$ are "off" or "on," respectively.

Each of the regenerators A and $a$ has an inlet C for air to be preheated in the regenerator. Such inlets open directly to the atmosphere in some coke ovens with which the present invention may be used with advantage, but as illustrated in Fig. 1, the air to be preheated in the regenerators A and $a$ is supplied under pressure to the inlets C by a supply conduit or main C' into which atmospheric air is passed by a blower $C^2$ having its inlet $C^3$ open to the atmosphere. As shown, each of the regenerators B and $b$ has a separate inlet D connected to a supply or main conduit D' which contains air under pressure in rich gas operation, and contains lean gas under pressure in lean gas operation. As diagrammatically shown in Fig. 1 in rich gas operation air is forced into the conduit D' by a pump $D^2$ which then has its inlet $D^3$ open to the atmosphere, and has its second inlet $D^5$ closed by a damper $D^6$. The inlet $D^5$ leads to a source of blast furnace or other lean gas, and in lean gas operation the valve $D^6$ is open and a valve or damper $D^4$ is adjusted to close the air inlet $D^3$. Each of the regenerators A, $a$, B and $b$, shown in Fig. 1, when serving as an "off" regenerator, discharges waste heating gases through a corresponding outlet F to a waste heat tunnel F' in which a suitable atmospheric pressure is maintained by a stack $F^2$ or other exhausting devices.

In the battery shown in Fig. 1, rich fuel gas is distributed by pipes G to the heating flues in which combustion is initiated during one set of reversal periods, and is distributed by the pipes $g$ to the heating flues in which combustion is initiated during alternate reversing periods. Each of the pipes G has a plurality of outlets G' and each pipe $g$ has a plurality of outlets $g'$, thus for example, in the case of a hairpin flue type battery of the particular form shown in Figs. 2 and 3, each pipe G is connected to one limb of each hairpin flue in a single heating wall, while the other limbs of the same flues are connected to an adjacent distribution pipe $g$. In Fig. 1 each of the rich gas distibution pipes G and $g$ receives rich fuel gas through a separate inlet H, which opens to the distribution pipe from a gas supply main H' into which gas is passed under suitable pressure by a gas pump $H^2$.

Each of the different inlets C, D and H and each of the regenerator outlets F is provided with a reversing valve. In Fig. 1, each of the different reversing valves which are open during one set of reversal periods are designated I, and those which are closed during that set of reversal periods and are open during the alternate set of reversal periods are designated $i$. All of the reversing valves I and $i$ are automatically shifted in the course of each reversing operation from their open positions to their closed positions or from their closed positions to their open positions, by a reversing means J which may take any one of various forms well known in the art, and hence need not be described further than to note that as diagrammatically shown the reversing mechanism J includes a plurality of cable or operating members $J^1$, $J^2$ and $J^3$ each of which extends longitudinally of the battery and is adjusted in one longitudinal direction in one reversing operation and in the opposite longitudinal direction in the following reversing operation.

The to and fro longitudinal adjustments of the member $J^1$ gives opening and closing adjustments to the valves I and $i$ in the regenerator inlets C and D, and the adjustments of the member $J^2$ gives opening and closing adjustments to the valves I' and $i$ in the regenerator outlets F. As shown in Fig. 1, the valves I in the inlets H to the distribution pipe G are opened and closed by the longitudinal adjustments of the member $J^3$, while the valves $i$ in the inlets H to the distribution pipe $g$ are opened and closed by longitudinal adjustments of the member $J^4$. The provision of separate operating means $J^3$ and $J^4$ for the two sets of rich gas reversing valves, has long been customary to permit of a time interval between the closure of one set, and the opening of the other set of rich gas reversing valves.

In rich gas operation of the battery shown diagrammatically in Fig. 1, the air inlet $D^3$ of the pump $D^2$ is open and its gas inlet $D^5$ is closed by the damper $D^6$, so that the pump D then supplies air under pressure to the main D'. At the same time the pump $C^2$ supplies air under pressure to the main C', and the pump $H^2$ supplies rich fuel gas to the main H'. As shown, the inlet pipe $H^3$ of the pump $H^2$ is connected to a rich gas source K which may be the treated gas outlet from a by-product plant receiving and treating the distillation gases from the coke oven battery shown in Fig. 1, or may be a rich gas distribution system receiving rich fuel gas made in one or more coke oven batteries or other gas producing units and supplying it not only to the battery shown in Fig. 1, but to other gas using apparatus.

For the purposes of the present invention, the pipe connection between the source K and pump inlet $H^3$ is formed with a bleed inlet L for the inflow of atmospheric air, and if necessary to maintain a sub-atmospheric pressure at the inner end of the inlet L, said pipe connection may include artificial pressure reducing means. For example, said pipe connection may include a Venturi pipe section L' as shown in Fig. 1, with an orifice or opening L formed in the wall of the throat portion of said Venturi section, or the piping may include an injector at the inlet or outlet side of the pump $H^2$, in which the gas is used as a motive fluid to draw atmospheric air into the piping. Thus, as shown in Fig. 1A, the pump $H^2$ may have its outlet connected to the pipe $H^1$ by an injector $H^4$ having an air inlet $H^6$ including a throttling or cut-off valve or damper $H^7$.

During one set of reversal periods, the valves I of Fig. 1 are all open and the valves $i$ are all closed and air is then preheated in all of the regenerators A and B, and rich fuel gas is then supplied through the different distribution pipes G to all of the heating flues connected at their lower ends to the upper portions of regenerators A and B. In this condition of operation all of the regenerators $a$ and $b$ are receiving heating gases from the heating flues having their lower ends connected to the upper portions of those regenerators, and each of the regenerators $a$ and $b$ is then discharging spent heating gases to the waste heat tunnel F. During this period of operation no rich fuel gas is distributed by the pipes $g$. During the alternate reversal periods, combustion air is preheated in the regenerators $a$ and $b$, rich gas is distributed by the pipes $g$, and the regenerators A and B discharge spent heating gases into the waste heat tunnel F.

In each of the different reversal periods, the rich gas supplied to the distribution pipes G or $g$ is admixed with atmospheric air drawn into the Venturi pipe section L' through its throat opening L, or into the injector $H^4$ through its inlet $H^6$. In the preferred form of the present invention, the orifice L or inlet $H^6$ should draw air from a portion of the atmosphere external to the basement space of the battery.

In the lean gas operation of the battery shown in Fig. 1, the damper $D^4$ is closed and the damper $D^6$ is open so that the pump $D^2$ then discharges into the main D, blast furnace or other lean gas drawn from a source to which the pump inlet $D^5$ is connected. In lean gas operation the pump $H^2$ is out of service and the reversing member $J^2$ and $J^3$ are advantageously adjusted into the positions in which they close all of the reversal valves I and $i$ in the inlets H to the distribution pipes G and $g$.

In Figs. 2 and 3, I have illustrated an embodiment of the present invention in a hairpin flue type of coke oven battery in which the distribution pipes G and $g$ supplying rich fuel gas to the heating flues, and other distribution pipes $A^2$, $B^2$, $a^2$ and $b^2$ supplying combustion air and lean fuel gas to the regenerators for preheating therein, are embedded in the bottom portion of the battery masonry, directly above the battery basement space, in the general manner disclosed in my prior patent Reissue No. 21,933.

In the battery shown in Figs. 2 and 3, each heating wall is formed with a series of hairpin flues. Each of the latter comprise a limb M having its lower end connected to a corresponding rich gas distribution pipe G by an uprising gas channel N in the regenerator division wall O beneath the heating wall, and each hairpin flue also comprises a limb $m$ connected by an uprising gas channel $n$ in the same wall O to the corresponding rich gas distribution pipe $g$. The gas supply channels N and $n$ alternate along the length of the regenerator division wall O beneath the heating wall containing the flues M$m$ to which the channels are connected. Rich fuel gas is supplied to the pipes G and $g$ of Figs. 2 and 3 from a main H' through inlets H including reversing valves I and $i$ operated by separate reversing mechanism members $J^3$ and $J^4$, all as previously described in connection with Fig. 1.

In the battery shown in Figs. 2 and 3, combustion air is directly supplied to the regenerators A and $a$ through distribution pipes $A^2$ and $a^2$ respectively, and from each of those regenerators spent heating gases are drawn through regenerator sole channels A' and $a'$ and outlets F into the waste heat channel by stack suction. The distribution pipes $A^2$ and $a^2$ which extend transversely of the battery are each connected at one end through an inlet C and reversing valve I or $i$ to an air supply main C' as in Fig. 1. Similarly, in the battery shown in Figs. 2 and 3, the regenerators B and $b$ receive combustion air or lean gas to be preheated through inlets D and reversing valves I and $i$ from the main D', and the regenerators B and $b$ discharge spent heating gases to the waste heat channel F through regenerator sole channels B' and $b'$ and outlets F each controlled by its individual reversing valve I or i.

In accordance with the present invention, each of the uprising rich gas supply channels N in a heating wall communicates through a conduit P' with an adjacent pipe P shown as extending transversely of the battery directly below the roof of the basement space and having an extension P² at one end through which the pipe P is open to the atmosphere externally of the battery space, when a reversing valve PI in said extension is open. As shown, each pipe P is connected by individual conduits P' to each of the rich gas supply channels N in the two immediately adjacent regenerator division walls O. Similarly, each of the uprising rich gas supply channels $n$ in two adjacent regenerator division walls are connected by individual branch conduits $p'$ to a corresponding air pipe $p$. At the points at which the pipes P' and $p'$ are connected to the channels N and $n$, respectively, the pressures are definitely sub-atmospheric as a result of the battery stack suction during the periods in which the flow is upward in the flues M and $m$ to which the channels N and $n$ are respectively connected. The air pipes $p$ which may be exactly like the pipes P, alternate with the latter along the length of the battery, and each pipe $p$ is provided with an extension $p^2$ opening to the atmosphere external to the basement space and including a reversing valve $pi$.

The reversing valves PI are automatically opened and closed at the same time as are the reversing valves I in the rich fuel gas inlets H leading to the distribution pipes G. To this end, the reversing mechanism member J³ which gives opening and closing adjustments to the last mentioned valves I, may also give opening and closing adjustments to the valves PI. Similarly, the reversing mechanism member J⁴ which opens and closes the valves $i$ in the inlets H through which gas is supplied to the distribution pipes $g$, may advantageously be employed to adjust the reversing valves $pi$. With the reversing valves PI open when, and only when the pipes G are distributing rich fuel gas to the channels N, and with the reversing valves $pi$ open when and only when the rich gas is being distributed to the channels $n$ by the pipe $g$, the advantage of mixing air with the rich fuel gas passing upward through the channels N and $n$, is obtained without any risk of passing air into the heating system through the channels N and $n$ at times when those passages are not supplying rich fuel gas. With the pipes P and $p$ in communication with the atmosphere only at points outside of the battery basement, any gas that may occasionally flow into the pipes P and $p$ as a result of an abnormal increase in the rich gas supply pressure in the pipes G and $g$, will pass through the extensions P' and $p'$ into the external atmosphere and can give rise to no risk of explosion or atmospheric pollution in the basement space of the battery.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims and that in some cases certain features of my invention may be used to advantage without a corresponding use of other features.

Having now described my invention, what I claim as new and desire to secure by Letters Patent is:

1. An underfired coke oven battery of the type comprising horizontal coking chambers, heating walls alongside said chambers and formed with vertical heating flues, regenerators and regenerator division walls between said chambers and heating walls and a subjacent basement space, said regenerator being connected to said flues for optional use in preheating combustion air for operation with rich fuel gas and in preheating both air and lean gas for operation with lean fuel gas, reversing means periodically reversing the direction of flow through said flues and regenerators, rich gas supply passages extending up to said flues through the regenerator division walls, and including the improvement which consists in means for supplying rich fuel gas admixed with air to the lower end of each such passage during alternate reversal periods in operation with rich fuel gas, comprising a source of rich fuel gas, a piping system having a portion including an inlet connected to a source of atmospheric air external to said basement space, suction means for moving rich fuel gas from said rich gas source toward said passage through said piping system portion and thereby creating a sub-atmospheric pressure in said piping portion and a reversing valve actuated by said reversing means to connect said passage to said rich gas source and to said inlet during reversal periods which alternate with reversal periods in which said passage is disconnected from source and inlet.

2. An underfired coke oven battery of the type, and including the improvement specified in claim 1 in which the means for supplying fuel gas to the different rich gas supply passages of the battery includes a common gas supply pump and in which the said piping portion including an inlet for atmospheric air is formed by a pipe having a lateral air inlet and connecting said rich gas source to the inlet of said pump.

3. An underfired coke oven of the type, and including the improvement specified in claim 1, comprising pipes extending transversely of and distributed along the length of the battery, each said pipes being connected to a plurality of rich gas supply passages located in a regenerator division wall adjacent the pipe, and each of said pipes having an opening and forming an inlet external to the basement space, through which air enters into admixture with the rich fuel gas supplied to each of the said last mentioned passages.

CARL OTTO.